(No Model.)
L. H. NASH.
IGNITER FOR GAS ENGINES.
No. 563,051. Patented June 30, 1896.
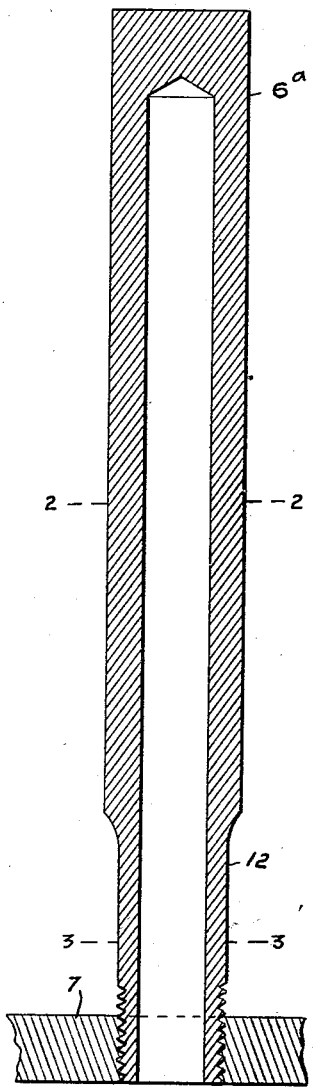
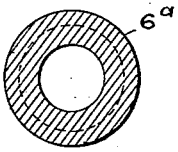
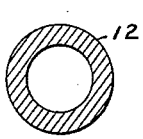
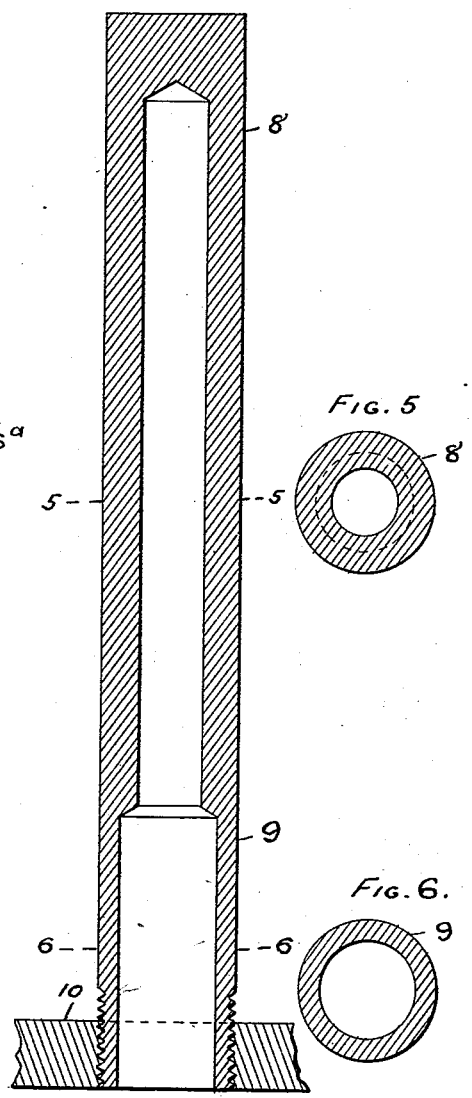
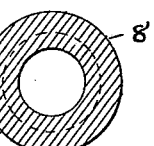
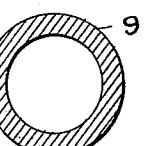
WITNESSES:
INVENTOR
Lewis Hallock Nash
BY
Johnson & Johnson
his ATTORNEYS.
ANDREW B.GRAHAM. PHOTO-LITHO. WASHINGTON, D.C.

UNITED STATES PATENT OFFICE.

LEWIS HALLOCK NASH, OF SOUTH NORWALK, CONNECTICUT, ASSIGNOR TO THE NATIONAL METER COMPANY, OF NEW YORK, N. Y.

IGNITER FOR GAS-ENGINES.

SPECIFICATION forming part of Letters Patent No. 563,051, dated June 30, 1896.

Application filed April 26, 1892. Serial No. 430,731. (No model.)

*To all whom it may concern:*

Be it known that I, LEWIS HALLOCK NASH, a citizen of the United States, residing at South Norwalk, in the county of Fairfield and State of Connecticut, have invented certain new and useful Improvements in Igniters for Gas-Engines, of which the following is a specification.

My present invention relates to igniters for gas-engines; and it consists of certain novel parts and combinations of parts hereinafter specifically set forth in the claims.

In the accompanying drawings I have shown two forms of igniters involving my present invention such as are at present preferred by me; but it will be understood that my invention is not limited to the precise forms shown, nor is it limited to the precise material described, as various modifications may be made without departing from the spirit of my invention and without exceeding the scope of the claims.

For the purpose of informing those skilled in the art to which my invention appertains, or with which it is most nearly connected, of the nature of the same, and of instructing them how it may be advantageously employed, I will now describe the accompanying drawings and devices illustrated therein.

Similar numerals of reference indicate the same parts in the various figures.

In the drawings, Figures 1 and 4 are longitudinal sections through igniters. Fig. 2 is a cross-section through Fig. 1 on the line 2 2. Fig. 3 is a cross-section through the same on the line 3 3. Fig. 5 is a cross-section of Fig. 4 on the line 5 5, and Fig. 6 is a cross-section through the same on the line 6 6.

My invention relates to the construction of the incandescent igniter. Igniters of this character are well known in the art, and in describing them here it is only necessary to observe that they consist of a suitable chamber heated to incandescence by an external source of heat, said chamber usually being inclosed in a suitable casing or chimney. The igniter is in communication with the combustion-chamber of a gas-engine, whereby the combustible charge is ignited.

Referring to Fig. 1, $6^a$ is a tube closed at one end. 7 is a portion of the gas-engine casing. This tube is shown as attached to the casing by a screw-joint. The lower end of the tube $6^a$—that is, the end which is nearest the casing—has walls of diminished thickness extending a distance above the casing. The same is true of the igniter-tube shown in Fig. 4, to which 8 is the upper part of the tube with thickened walls, 9 the lower part with walls of diminished thickness, and 10 the engine-casing. The only difference between the igniters shown in these figures is that in Fig. 1 the walls of diminished thickness are made by reducing the external diameter of the tube, while in Fig. 4 the walls of diminished thickness are made by increasing the diameter of the bore, the external diameter of the tube being uniform throughout. In both cases the portion of the tube nearest the engine-casing is of diminished thickness.

In an incandescent igniter that portion which is nearest the engine-casing is maintained at a lower heat, due in part to the fact that there is more or less rapid conduction of heat from it to the engine-casing. Usually this part is not incandescent for this reason. The upper part of the igniter, that farther removed from the casing, is maintained in a state of incandescence and at a temperature requisite to ignite the charge. At the upper portion if the tube be of iron the oxidation of the metal of the tube is more rapid because its temperature is higher. If it be of aluminium bronze, the upper portion is weaker, because hotter. It is therefore necessary to make its walls of a given thickness, in order to make it last long enough for ordinary practical purposes. The part of the tube nearest the casing does not oxidize so rapidly, and hence may be made thinner and yet last as long as the other parts. However, an important advantage is gained by making the walls of the lower part of the tube thinner. The advantage is that the conduction of heat from the upper part of the tube to the casing is thereby diminished, as the conduction of heat is proportional to the amount of metal by which it is conducted. Hence without decreasing the life of the structure I obtain for a given expenditure of energy a higher temperature in the upper portion of the tube by diminishing the section of that part nearest the casing.

An advantage of the form shown in Fig. 4 depends upon the enlargement of the bore at the lower end without reference to the thickness of the walls in different portions of the tube, due to the fact that the gas being at lower temperature in the lower end the flash travels through this part slower than it does above. Hence a larger chamber here is advantageous, even when the tube is of equal thickness throughout its entire length.

In the foregoing specification I have referred to a few of the modifications which may be employed in the practice of my invention, but I wish it to be understood that mention by me of a few modifications is not intended to exclude others not referred to and which are within the spirit of my invention. In the concluding claims the omission of an element above referred to, or the omission of reference to the particular features of the elements mentioned, is intended to be a formal declaration of the fact that the omitted elements or features are not essential to the inventions severally covered therein.

Having thus described a structure embodying my present invention, what I claim, and desire to secure by Letters Patent, is—

1. In an incandescent igniter for a gas-engine, an igniter in communication with the combustion-chamber having a portion of its walls nearest the engine-casing and extending a distance above said casing formed of a thinner material.

2. In an incandescent igniter for a gas-engine, an igniter-chamber in communication with the combustion-chamber of an engine in which the walls of that portion of the chamber which are maintained at incandescence are thicker than the walls of that portion which are maintained at a lower temperature.

3. In an incandescent igniter for gas-engines a chamber in communication with the combustion-chamber of the engine the bore of which is larger at the lower end than above.

In testimony whereof I have hereunto signed this specification in the presence of witnesses.

LEWIS HALLOCK NASH.

Witnesses:
GEO. A. MAYLAND,
WM. M. BROWN.